(12) United States Patent
Huotari et al.

(10) Patent No.: US 7,411,911 B2
(45) Date of Patent: Aug. 12, 2008

(54) NETWORK AVAILABILITY STATUS DETECTION DEVICE AND METHOD

(75) Inventors: Allen J. Huotari, Garden Grove, CA (US); Manrique Brenes, Corona Del Mar, CA (US); Matthew B. McRae, Laguna Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 11/102,377

(22) Filed: Apr. 8, 2005

(65) Prior Publication Data

US 2006/0227725 A1    Oct. 12, 2006

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl. .................. 370/236; 370/395.2; 370/392
(58) Field of Classification Search ............. 370/230, 370/236, 392, 395.2, 395.21
See application file for complete search history.

(56) References Cited

U.S. PATENT DOCUMENTS

| | | | |
|---|---|---|---|
| 2003/0139197 A1* | 7/2003 | Kostic et al. ............ 455/525 |
| 2003/0159064 A1* | 8/2003 | Takahashi ............... 713/200 |
| 2004/0174890 A1* | 9/2004 | Chen et al. ............. 370/402 |
| 2004/0196846 A1* | 10/2004 | Salonen .................. 370/392 |
| 2004/0223476 A1* | 11/2004 | Jose et al. ................ 370/338 |
| 2005/0052994 A1* | 3/2005 | Lee ......................... 370/230 |
| 2005/0114496 A1* | 5/2005 | Fang et al. ............... 709/224 |
| 2005/0180463 A1* | 8/2005 | Jones et al. .............. 370/493 |
| 2006/0098620 A1* | 5/2006 | Zhou et al. .............. 370/352 |
| 2006/0114881 A1* | 6/2006 | Chari et al. .............. 370/351 |
| 2006/0198356 A1* | 9/2006 | Mayernick .............. 370/351 |

* cited by examiner

*Primary Examiner*—Edward Urban
*Assistant Examiner*—Christian A Hannon
(74) *Attorney, Agent, or Firm*—MacPherson Kwok Chen & Heid LLP; Mark A. Pellegrini

(57) ABSTRACT

According to an embodiment of the present invention, a device configured to send and receive messages over a first network and a second network includes a network status detector unit and a network disabling unit. The network status detector unit is configured to detect the availability of the first network and output a first network status signal indicating the availability or unavailability of the first network. The network disabling unit is configured to receive the first network status signal and disable the sending and receiving of messages on the second network when the first network status signal indicates the first network is unavailable.

12 Claims, 8 Drawing Sheets

NETWORK AVAILABILITY STATUS DETECTION DEVICE AND METHOD

TECHNICAL FIELD

This invention relates generally to network access, and more particularly to the detection of network availability in a hierarchical network.

BACKGROUND

When using a hierarchical network such as the Internet for communications, interruptions in communications due to network unavailability are common. Typically, a local area network (LAN) at a lower level of the hierarchy is connected to a wide area network (WAN) at a higher level of the hierarchy through a gateway or other network device that accesses both networks. Network congestion or possibly a temporary loss of connection on the WAN may require network devices on the LAN to momentarily suspend their access in terms of deferring the sending or receiving of data. In an application of transferring text or data files, the delays that are incurred due to deferral are not usually significant since text and data files do not need to be delivered in real-time, meaning there is generally no time boundary for completion of the transfer. Therefore, the typically short delays incurred do not generally inhibit the successful communication of information.

Even in the case where a LAN connection to the Internet is made wirelessly, if the application is text or data transfer, an interruption causes the transfer to pause until the network is available in order to continue sending or receiving the necessary information. However, when the application requires a lower latency in message transfer as typified by streaming audio and/or video, teleconferencing, and voice over Internet Protocol (VoIP), delays due to network unavailability are not desirable. For example, although a traditional wireless network device can usually give some indication of the status of the direct wireless connection, a traditional wireless network device is not aware of the availability status of an indirectly connected network, such as the WAN, which may affect the latency of communications with the wireless device and cause disruption in some applications. Accordingly, there is a need in the art for a network device to determine the availability status of a network other than the network to which the network device is directly connected. Additionally, there is a need in the art for a network device to determine the availability status of a network before directly connecting to the network device.

BRIEF DESCRIPTION OF THE DRAWINGS

Embodiments of the present invention and their advantages are best understood by referring to the detailed description that follows. It should be appreciated that like reference numerals are used to identify like elements illustrated in the figures.

DETAILED DESCRIPTION

Figure 1:
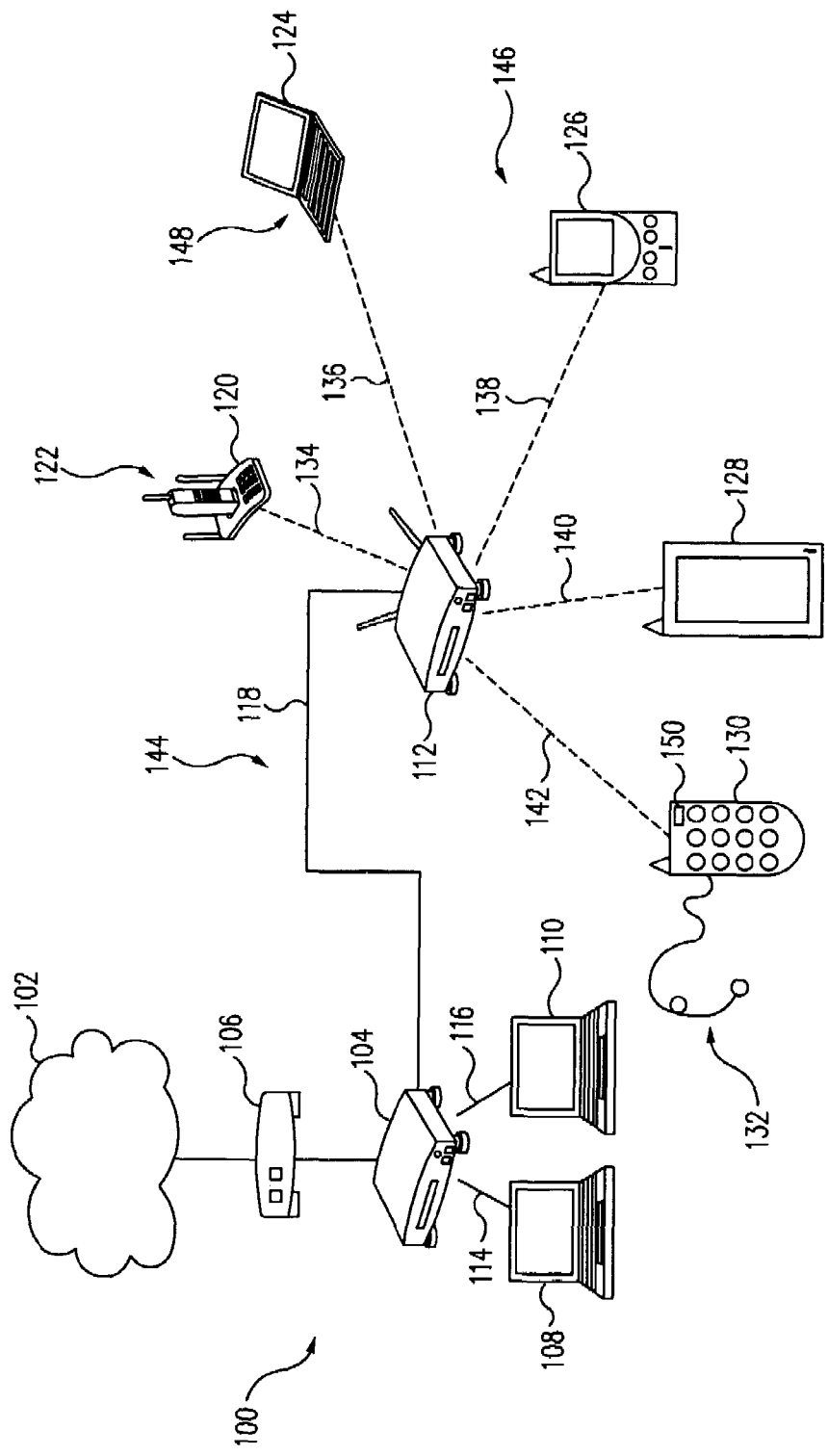
FIG. 1 shows a portion of an exemplary hierarchical network in accordance with an embodiment of the invention.

In reference to FIG. 1, an exemplary hierarchical network 100 connected to the Internet 102 is illustrated. Generally, a hierarchical network includes a plurality of interconnected network segments with each end of each network connection or segment terminating on a network device. Information is transferred on the hierarchical network in packets or messages carrying the address of their intended target network device. The network 100 includes a router 104 or switch connected to a modem 106 that provides a connection to Internet 102. The capabilities of the router 104 and modem 106 may be combined into a single unit such as a gateway network device. Due to the hierarchical nature of various network topologies, the distinction between a wide area network (WAN) versus local area network (LAN) is relative and is largely based on the location of a particular network device on a particular portion of the hierarchical network.

A router is typically placed as a connection point between two networks in order to connect a WAN at a higher level of the network hierarchy to a LAN at a lower level of the network hierarchy. In this manner, a computer terminal 108, a computer terminal 110, and router 112 are connected to a network device or apparatus such as a router 104 that includes both wired and wireless network connectivity, and can be a wireless access point (WAP) 112. In this manner, the network connections (114, 116, and 118) between each of terminal 108, terminal 110, and router 112, respectively, are considered to be local to each other to form a LAN that is connected to the rest of the hierarchical network through router 104.

FIG. 1 includes another hierarchical level, where a number of diverse, wireless network devices are connected to WAP 112. In this example, these wireless devices include a Voice Over Internet Protocol (VoIP) telephone 120 with a wireless handset 122, a laptop 124, a hand-held computer 126, a tablet computer 128, and a wearable VoIP telephone 130 with a headset 132 that includes a microphone and an earphone. Wireless VoIP telephone 120 makes a wireless connection 134 with WAP 112, wireless laptop 124 makes a wireless connection 136 with WAP 112, wireless hand-held computer 126 makes a wireless connection 138 with WAP 112, wireless tablet computer 128 makes a wireless connection 140 with WAP 112, and wearable wireless VoIP telephone 130 makes a wireless connection 142 with WAP 112.

In this configuration terminal 108, terminal 110, and WAP 112 can be considered a member of a wide area network (WAN) 144, while VoIP telephone 120, laptop 124, computer 126, computer 128, and telephone 130 can be considered a member of a wireless local area network (WLAN) 146. Although the wireless connections (134, 136, 138, 140, and 142) are independent from each other, they are all members of the same network, so that both independently and together they may be referred to as network 146. In this manner, the term network can refer to both to a particular unshared connection between network devices or a collection of such connections. Alternatively, WAP 112 can also include one or more wired connections to network devices associated with network 146 so that all network devices associated with WAP 112 are considered to be members of the same LAN. In yet another alternative, another hierarchical network can be connected through WAP 112 where another router (not shown) is connected through either a wired or a wireless network connection to WAP 112. In this manner, although network devices (120, 124, 126, 128, and 130) may be terminal network devices, LAN 146 would not be considered a terminal network.

Laptop 124 includes an indicator 148 to portray or show the availability or unavailability status of wireless connection 136. Similarly, telephone 130 includes an indicator 150 to portray the status of wireless connection 142. Indicators (148, 150) can include a strength meter, an illuminated indicator such as a ready light or a not-ready light, an icon or graphical symbol on a display, or some other indication to convey the status of the wireless connection "ready status" to a user. In another alternative, indicators (148, and 150) can be auditory such as a beeper or a buzzer to more urgently indicate the status of their wireless connections (136, and 142) respectively. In this manner, a beeping or buzzing wireless device can be urgently identified as requiring user attention.

Traditionally, indicators (148 and 150) only indicate the status of their wireless connections and do not reflect the ability of WAP 112 to send and receive message data to or from another connected network. In a traditional wireless networking system, a user may perceive this "ready status" indicating a good network connection between the wireless device and the wireless access point and falsely believe that data transfer through the wireless access point is available.

Wireless Fidelity, or "Wi-Fi", refers generally to any type of communications network that conforms to any of the Institute of Electrical and Electronics Engineers (IEEE) 802.11 wireless local area network (WLAN) standards. However, it is more useful in specific applications for the Wi-Fi device to know the current status of the WAN connection because many services require this connection to be active and available to sustain additional use (such as VoIP, streaming content from Internet, etc.) prior to initiating delivery of the service. Thus the device could display the actual status of the full network connection to the required service and provide a more accurate representation to the end user. Furthermore, the actual status of the full network connection can be used to assist the end user and/or device in deciding whether or not to connect to the WLAN.

For example, a Wi-Fi VoIP telephone (120, 130) would show signal strength for the connection to WAP 112 but might not have an adequate WAN connection required to place or receive telephone calls. In this case, a user would be confused, or misled into believing the Wi-Fi telephone was available when it was not actually possible to place or receive telephone calls. However, when the indicators (148 and 150) also convey information about the WAN/service connection, the indicators reflect the actual availability status, even when a wireless connection was established and the WAN connection is not available, in order to provide a more useful network status information to a user. Alternatively, this network status information can be used by network devices in order to effect a reconfiguration of the network connections in order to restore service.

When laptop 124 communicates with another network device outside WAN 144 on Internet 102, all network messages must pass from laptop 124, through WLAN 146, through WAN 144, to Internet 102. If WAN 144 is congested due to higher traffic volume, for example, then messages may not be passed reliably between Internet 102 and laptop 124. However, simply because the communication or carrier channel exists and is stable between a first network device and a second network device in a hierarchical network, that is no guarantee that messages may be successfully passed through the network device onto yet another level of network hierarchy. Loss of connection or congestion at one level of the hierarchical network may deter communications even if a particular local channel is available.

For the purposes of this disclosure, the phrases "Wireless Access Point" (WAP) or "access point" (AP) refer to either a standalone Access Point, or to an Access Point that is integrated within another device (typically a Router or Gateway). Furthermore, the terms "congestion" and "unavailable" include the condition where a network connection will not sustain additional use. Stated differently, a congested or unavailable network is one that may be currently operational but will not sustain additional use. The amount of additional use allowed or required depends on many factors including the expected data rate requirements, measured in bits-per-second (BPS), of a candidate application for connection to the network. A non-operational network, such as a broken connection, clearly is not available for message passing and could also be classified as not able to sustain additional use.

As more wireless devices based on IEEE 802.11 technology are being developed, these new devices may be deployed as part of a service provided over the Internet or network connection. However, while the device may have access to a wireless network it may not have access to the WAN for service. Specifically, the client may be associated with a particular AP, but that does not provide any information as to whether that client can access services over the AP's WAN connection. It is desirable for the client device to know the status of the WAN connection for several reasons. One reason is to accurately convey to the user the status of service. In the case of a Wi-Fi phone, the phone may find a wireless network with good signal strength and the phone would show a full signal strength meter on the display. However, the WAN or network connection (on the WAN side of the wireless AP) may be down and the VoIP telephone would be unable to place a call, receive a call, or access other services. This would likely be confusing to the user, or possibly dangerous if an emergency situation arose requiring immediate communication using the VoIP telephone.

Figure 2:
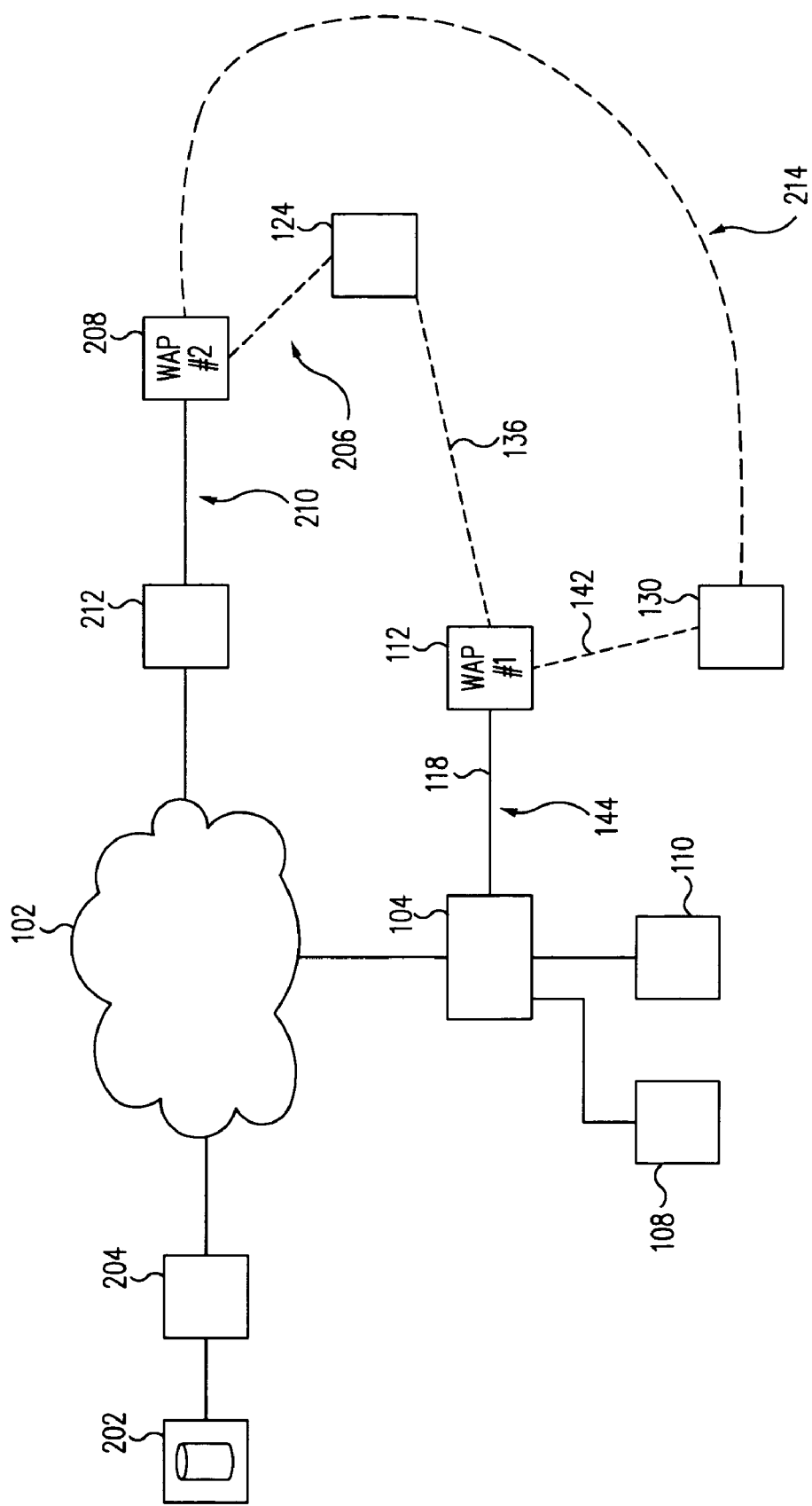
FIG. 2 shows a portion of another exemplary hierarchical network in accordance with an embodiment of the invention.

In reference to FIG. 2, another exemplary hierarchical network 200 is illustrated. A benefit of knowing the WAN status or service connectivity status is that a particular wireless device (124 or 130) could make a better wireless network selection in the case that the current wireless network selection becomes unavailable or unreliable. In one example, a video server 202 is connected through a router 204 to Internet 102. Video server 202 supplies streaming video through Internet 102 to laptop 124. If congestion occurs on WAN 144, the streaming video may be interrupted, or the connection lost. If while laptop 124 is receiving streaming video from video server 202, laptop 124 discovers WAN 144 is congested or not available for some reason, laptop 124 can terminate the connection 136 to WAP 112 and form a new connection 206 with a different WAP 208 connected through another WAN 210 to a router 212 that is connected to Internet 102. In this manner, laptop 124 can establish a different connection to Internet 102 in order to resume access to the streaming data from video server 202. Similarly, if the WAN connection of WAP 112 goes down or loses connection, laptop 124 could try to associate with an alternate WAP, such as WAP 208, until laptop 124 finds a WAP with a good WAN connection in order to access services.

In another example, network device 130 is a Wi-Fi telephone that has a wireless connection 142 with WAP 112. If the WAN connection of WAP 112 becomes unavailable, network device 130 could try to associate with alternate WAP 208 until it finds a good WAN connection to access services. In this manner, network connection 142 would be terminated and a new network connection 214 would be established between Wi-Fi telephone 130 and WAP 208 if WAN 210 can sustain additional use. Thus, any methods of selecting a wireless network will be improved if the wireless client can know the WAN connection status of a candidate WAP, or if a wireless network with a congested or unavailable WAN connection is not available for selection. Another benefit of detecting the WAN connection status is the ability to improve the user interface on the client network device in order to display a more accurate and useful representation of the service availability.

Figure 3:
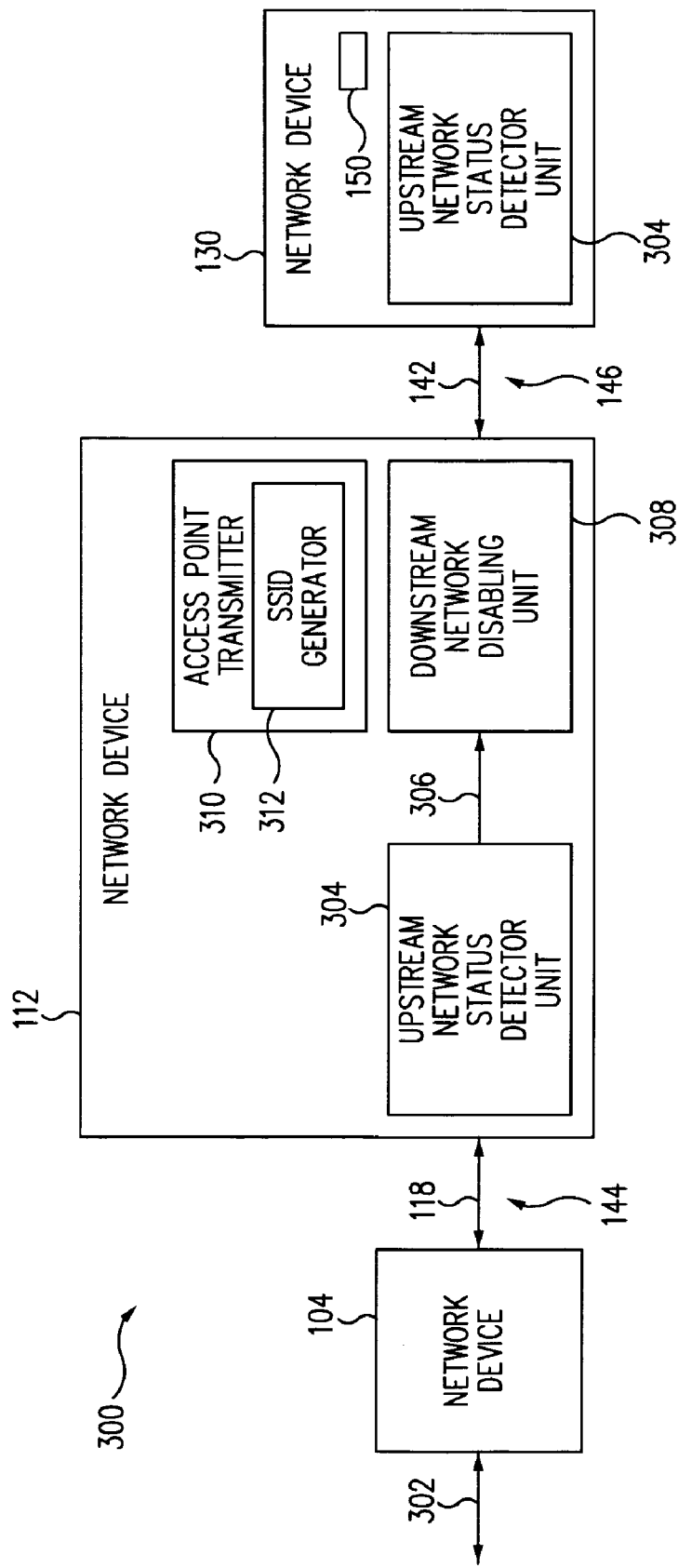
FIG. 3 shows a portion of a hierarchical network including a status detecting system in accordance with an embodiment of the invention.

FIG. 3 shows a portion of a hierarchical network including a status detecting system 300 having a first network device 104 connected to both a first network 302 and to a second network 144. Similarly, a second network device 112 is connected to second network 144 and a third network 146. Finally, a third network device 130 is connected to third network 146 as a terminal network device. As a terminal network device, no other network devices connect to hierarchical network 300 through third network device 130. It is understood in this disclosure that the designations of first, second, third, and others are arbitrary and are used to illustrate relationships and interconnections between various networks and network devices. Network messages between second network device 112 and a network device on or beyond first network 302 can move in an upstream direction from a lower level of hierarchy to pass through second network 144, first network device 104, and first network 302 at a higher level of hierarchy. Conversely, network messages between a network device on or beyond first network 302 and second network device 112 can move in a downstream manner to pass through first network 302, first network device 104, and second network 144, to reach second network device 112.

Network messages between third network device 130 and a network device on or beyond first network 302 can move in an upstream direction to pass through third network 146, second network device 112, second network 144, first network device 104, and first network 302. Conversely, network messages between a network device on or beyond first network 302 and third network device 130 can move in a downstream manner to pass through first network 302, first network device 104, second network 144, second network device 112, third network 146, to reach third network device 130. Congestion on second network 144, or specifically on network connection 118, can inhibit the sending and receiving of messages between first network device 104 and second network device 112, even if the downstream network, or specifically on connection 142, between second network device 112 and third network device 130 is established and available.

According to an embodiment of the present invention, second network device 112 includes an upstream network status detector unit 304 for determining the availability status of upstream network 144 and producing an availability signal 306 that is asserted true when second network 144 is available and asserted false when second network 144 is not available. Second network 144 can be unavailable due to congestion, a loss of connection, communication disruption, or other network interruption. In all of these cases, second network 144 will not sustain additional use. Availability signal 306 is a network status signal and can have many acceptable forms including as an internal value set in a register, as an electrical signal, or as a visual indicator that can reveal one of two states in order to communicate the network availability status. When availability signal 306 is asserted, it assumes a value that represents availability. When availability signal 306 is not asserted, or de-asserted, availability signal 306 assumes a value that represents unavailability.

Second network device 112 includes a downstream network disabling unit 308 for receiving the availability signal 306 and disabling the downstream network 146 when the availability signal 306 is asserted false, or is de-asserted. When third network 146 is disabled, the connection 142 is effectively lost and messages cannot continue to be sent and received on third network 146. Third network device 130 also includes an upstream network status detector unit 304 that detects the loss of connection 142 in third network 146. In this manner, the status of second network 144 is communicated to third network device 130 in the form of the loss of network connection 142 or third network 146. When second network 144 is no longer congested, is re-established, or becomes available again at a later moment in time, availability signal 306 is asserted true and third network connection 142 is again enabled in response to the availability of second network 144. If second network 144 is a wide area network (WAN) connection, and third network 142 is a wireless local area network (WLAN) connection, this embodiment conveys the WAN connection status to a wireless device by disabling the wireless network 146, or more generally, by modifying the state of the wireless network itself. Third network device 130 detects the loss of network connection 142 and asserts an appropriate indicator value on indicator 150 showing the loss of network connection 142.

In one embodiment, second network device 112 includes a wireless access point (WAP) transmitter 310 that includes a service set identifier (SSID) generator 312. WAP transmitter 310 is a part of a radio frequency (RF) transceiver for sending and receiving wireless signals to and from a wireless device to provide bidirectional communication. In order to be compatible with devices manufactured by different vendors, most vendors comply with various standards such as the IEEE 802.11 family of protocols related to wireless communications. When one access point (AP) is connected to a wired network and a set of wireless stations to form a single sub-network (LAN), it is referred to as a Basic Service Set (BSS). Two or more BSSs that form a single sub-network are referred to as an Extended Service Set (ESS). In the 802.11 family of protocols a particular frame of data called a beacon is transmitted that includes the SSID, also referred to as a NetID or ESSID, which may be used to configure the access between a wireless device and the WAP. If the SSID is not broadcast, then a wireless device cannot passively locate and identify the WAP, thereby preventing the connection between wireless network device 130 and WAP 112.

When network 144 is unavailable, second network device 112 can turn off the broadcast of the SSID in order to prevent or inhibit the completion of a wireless connection, or association, between wireless network device 130 and second network device 112. Alternatively, disabling AP transmitter 310 itself will fully prevent the connection between wireless network device 116 and WAP 112. In both of these cases, the user interface, or indicator 150, on wireless network device 130 can reflect this loss of connection to the network in the form of a status indicator showing no connection or a strength meter showing no signal. If second network 144 subsequently becomes available again, the SSID broadcast can be resumed, or the AP transmitter 310 can be again enabled, allowing the third network device 130 to associate, or re-associate, to second network device 112 in order to gain access to network services. This process allows the wireless network device to show an accurate representation of the actual hierarchical network status and access to services. If the upstream network connection is congested or not available, the wireless network device then either waits for the upstream network connection to be re-established or the wireless network device can then automatically associate with another AP that has an available WAN connection.

Disabling the WAP transmitter 310 can affect other wireless clients that may not need high reliability or low latency WAN access. For example, a Wi-Fi telephone 130 must have WAN access in order to function but laptop 124 or other similar devices may be running applications that do not require WAN access so that disabling the third network 146 may not be necessary or desirable. Alternatively, a WAP transmitter 310 that use two separate SSIDs (one for voice and one for data) would not suffer this problem if only the voice SSID was disabled in the case of a loss of WAN availability while the data SSID may remain enabled.

Figure 4:
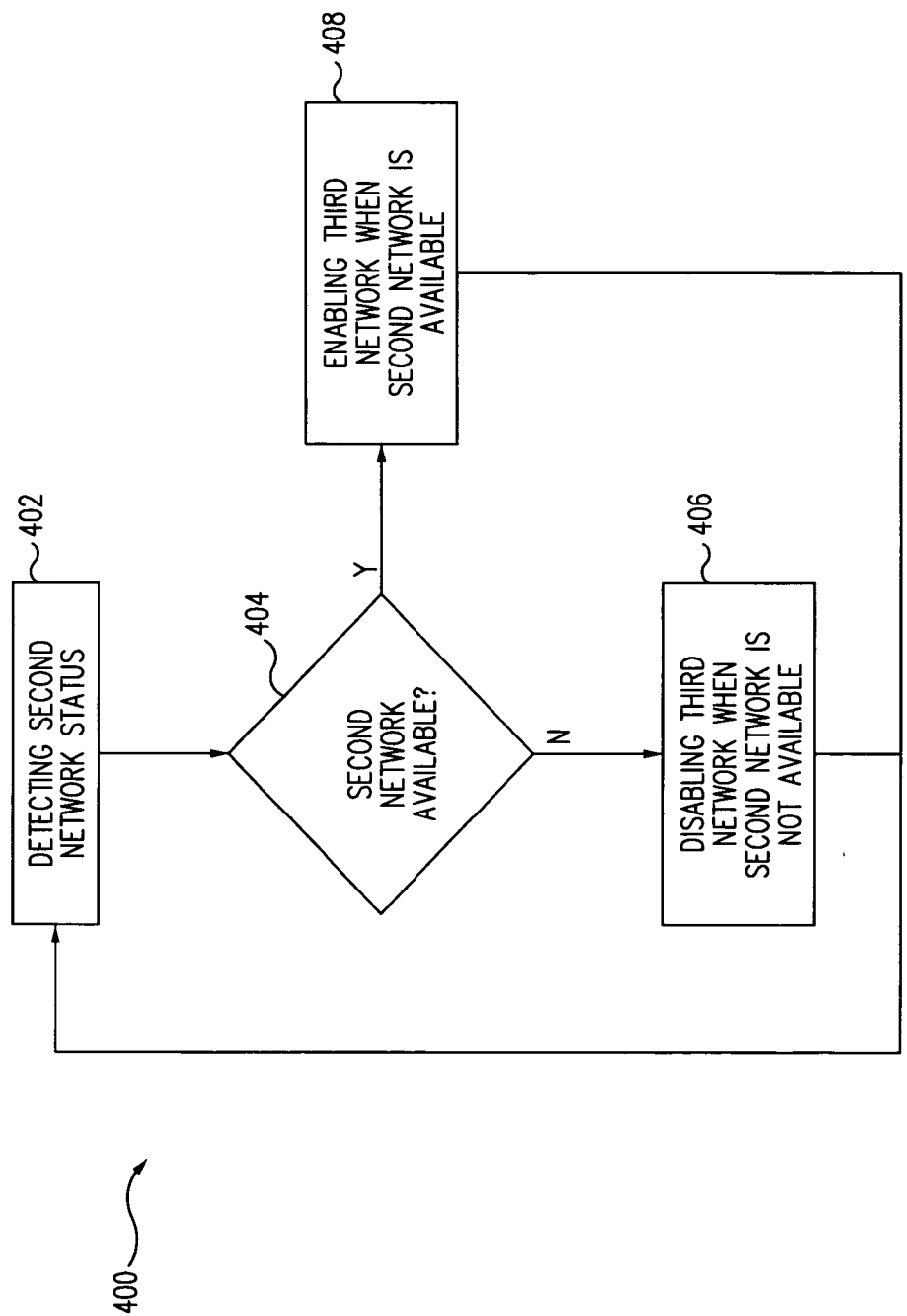
FIG. 4 shows a network availability flow illustrating a method of using a status detecting system in accordance with an embodiment of the invention.

FIG. 4 shows a network availability flow 400 illustrating a method of using the status detecting system 300 as described in reference to FIG. 3. Within the context of FIGS. 3 and 4, first network device 104 is connected to both first network 302 and to second network 144, while second network device 112 is connected to both second network 144 and third network 146. Finally, third network device 130 is only connected to third network 146. In reference to FIG. 4, in a first operation 402, second network device 112 detects second network 144 status. In step 404, second network device 112 determines whether second network 144 is available. If second network 144 is not available, control moves to operation 406 where third network 146 is disabled and control moves back to operation 402. Conversely, if second network 144 is or becomes available, control moves to operation 408 where third network 146 is enabled and control moves back to operation 402. This looping behavior is repeated periodically to ensure third network 146 is available only when second network 144 is available.

In another embodiment, information is transferred to third network device 130 in order to convey the availability or unavailability status of second network 144 to sustain additional use. In reference to FIG. 5, a portion of a hierarchical network includes a status detecting system 500 having an embodiment of second network device 112 that includes a downstream status message broadcasting unit 502, and an embodiment of third network device 130 that includes an upstream status message receiving unit 504. Upstream network status detector unit 304 detects the status of second network 144 and asserts availability signal 306 that is asserted true when second network 144 is available and asserted false when second network 144 is not available. Status message broadcasting unit 502 receives availability signal 306 and sends a downstream status message indicating second network 144 is not available when availability signal 306 is asserted false. Second network device 112 shown in the embodiment of status detecting system 500 differs from second network device 112 in the embodiment of status detecting system 300 based on the presence or absence of various sub-elements having different capabilities as shown and described. Similarly, third network device 130 shown in the embodiment of status detecting system 500 differs from third network device 130 in the embodiment of status detecting system 300 based on the presence or absence of various sub-elements having different capabilities as shown and described. The same device names and reference numbers are used to show the same relative position the network devices (112, 130) within the hierarchical network as shown in FIGS. 1 and 2.

Figure 5:
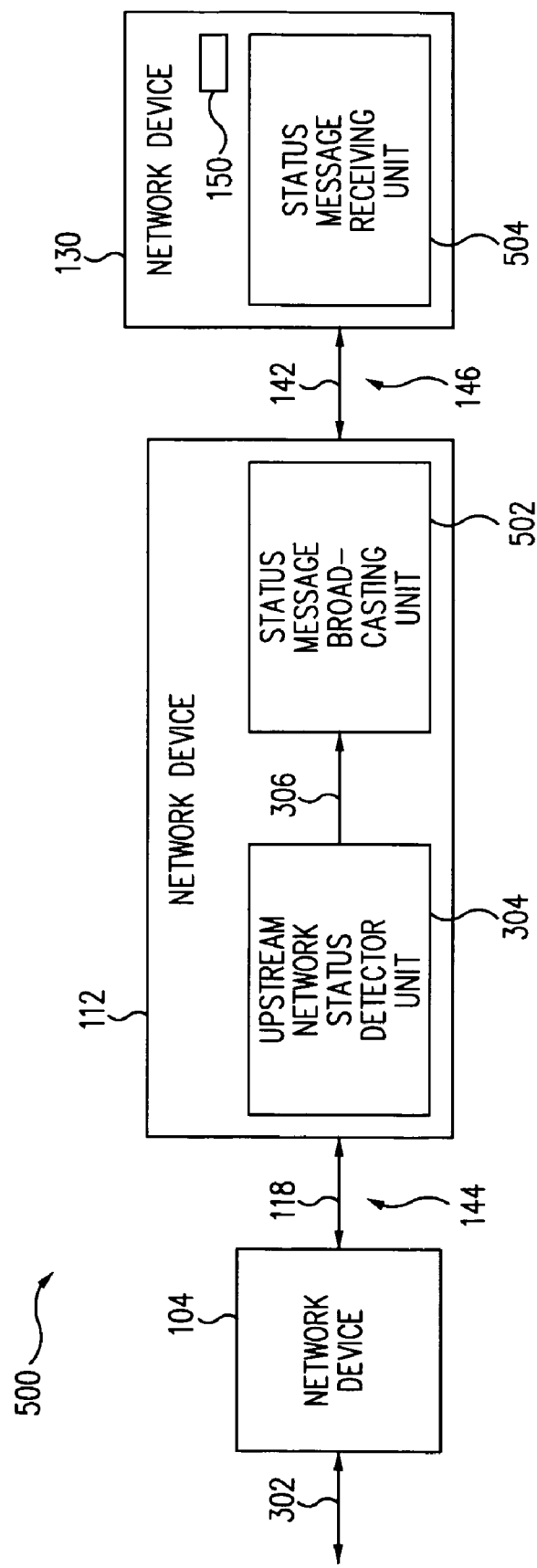
FIG. 5 shows a portion of a hierarchical network including a status detecting system in accordance with an embodiment of the invention.

In reference to FIG. 5, third network device 130 receives the status message in status message receiving unit 504 which updates the assertion of indicator 150 in order to accurately reflect the status of second network 144. If second network 144 becomes available again, upstream network status detector unit 304 detects this changed status, and status message broadcasting unit sends a downstream status message on third network 146 indicating the availability of second network 144. This status message can be a stand-alone message, or contained within another message that may be periodically or on-demand sent to communicate status of this or other parameters to the downstream system. Since the nature of the message communicates one of two states, either second network 144 is available or it is not available, the status message can be carried as a single binary digit (bit). This single network status bit corresponding to the upstream network can be embedded with other status information. In this manner, the availability status of a higher network segment may be communicated to a lower network segment within a hierarchical network. In this manner, the availability status of each higher network device in the network hierarchy can be communicated to each lower network device.

In a wireless embodiment conforming to the IEEE 802.11 family of protocols, when second network 144 becomes unavailable, second network device 112 as the access point (AP) can set a flag in an information element inside of a probe response to third network device 130 as the wireless client. The exact syntax of this flag is unimportant since the flag element would convey a simple status of the WAN connection and can be logic-0=WAN down, logic-1=WAN up, in a binary fashion. If second network 144 becomes available and the WAN connection is again established, second network device 112 can change the status of the information in the probe response to convey the WAN connection status to one or more wireless clients. Further, second network device 112 as an AP could utilize an information element inside a broadcast beacon sent from second network device 112. In this manner, a wireless client such as third network device 130 can passively detect the WAN connection of second network 144 status prior to initiating an association with an AP connected to an unavailable WAN connection. Alternatively, second network device 112 can avoid broadcasting a network availability message when one is expected by third network device 130 in the case that second network 144 is unavailable. In this manner, the absence of an expected availability message conveys that second network 144 is not available.

In another embodiment, second network device 112 can include upstream network status detector unit 304, downstream network disabling unit 308, access point transmitter 310, SSID generator 312, and status message broadcasting unit 502 so that SSID broadcast can be turned off when second network 144 is unavailable and an unavailability message is broadcast by status message broadcasting unit 502. In this manner, a new wireless network device would be unable to successfully connect to second network device 112 while second network 144 is unavailable, and currently associated clients would continue to receive WAN status information via the information element in the beacon message broadcast from second network device 112.

Figure 6:
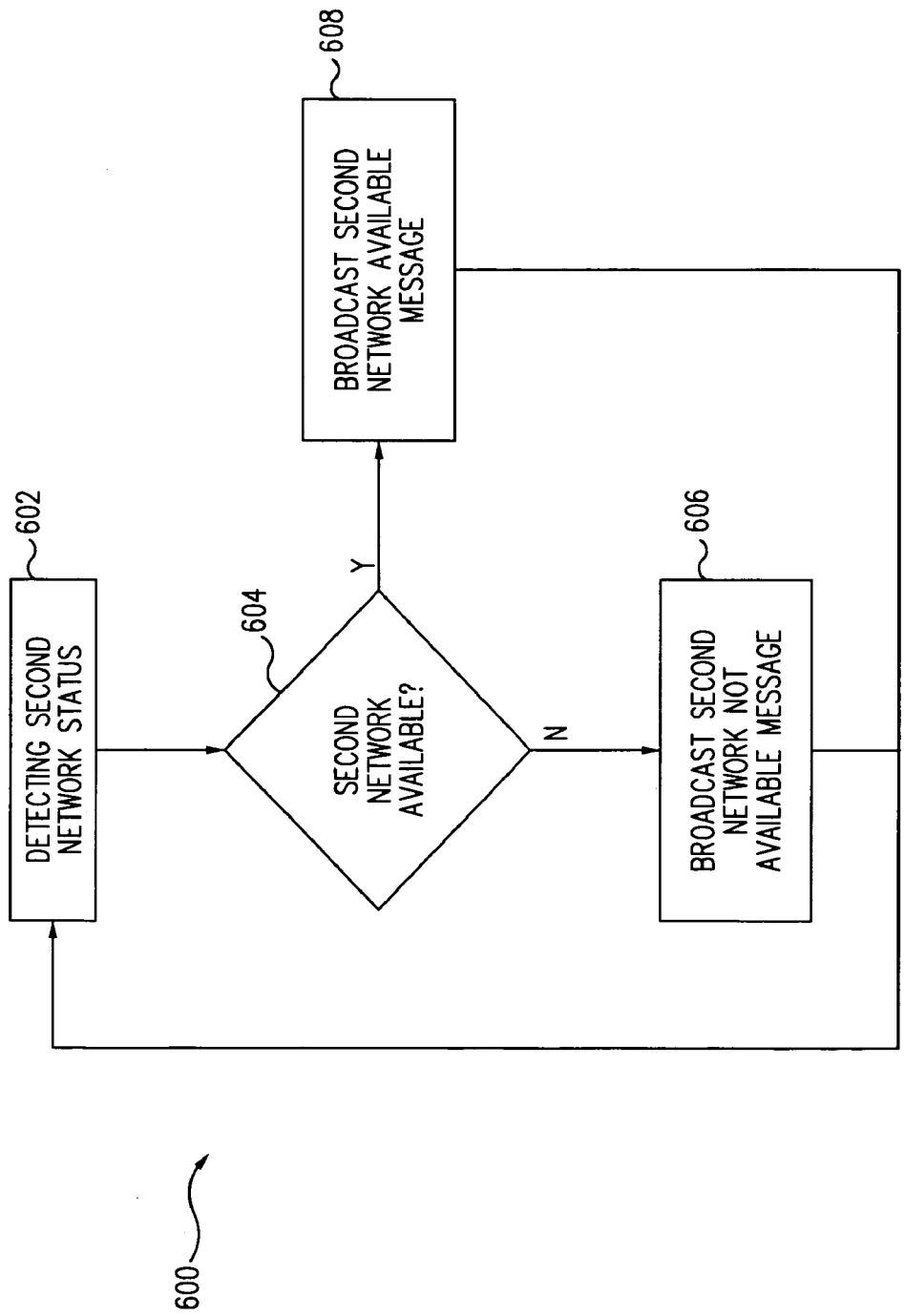
FIG. 6 shows a network availability flow illustrating a method of using a status detecting system in accordance with an embodiment of the invention.

FIG. 6 shows a network availability flow 600 illustrating a method of using the status detecting system 500 as described in reference to FIG. 5. Within the context of FIGS. 5 and 6, first network device 104 is connected to both first network 302 and to second network 144, while second network device 112 is connected to both second network 144 and third network 146. Finally, third network device 130 is only connected to third network 146. In reference to FIG. 6, in a first operation 602, second network device 112 detects second network 144 status. In step 604, second network device 112 determines whether second network 144 is available. If second network 144 is not available, control moves to operation 606 where second network device 112 broadcasts a network unavailability message and control moves back to operation 602. Conversely, if second network 144 is available, control moves to operation 608 where second network device 112 broadcasts a network availability message and control moves back to operation 602. Alternatively, second network device 112 avoids broadcasting an expected network availability message which, by its absence, conveys second network 144 is unavailable. This looping behavior is repeated periodically to ensure third network 146 is available only when second network 144 is available.

In another embodiment, third network device 130 can actively determine the status of second network 144 by sending a status request message to a replying target device on or beyond second network 144, where the replying target device sends a status reply message indicating receipt of the status request message. In this manner, third network device 130 verifies the availability of a predetermined network path between third network device 130 and the target device by successfully passing messages across the network path. As described, a hierarchical network includes a plurality of interconnected network segments with each end terminating on a network device. The location of each network device on the hierarchical network refers to the attachment point to the hierarchical network and the relative location of each network device to other network devices based on their particular network interconnections.

When passing messages between various network devices, the messages may traverse a plurality of network segments in either an upstream or a downstream manner, as described. When a particular network device sends a message to another particular network device, the message may traverse some portion of the hierarchical network in an upstream manner and other portions of the hierarchical network in a downstream manner. A target network device is one that is the destination for a particular message or is the source of a particular service. Similarly, a sending network device can be said to target a particular network device, node, or server by sending a message intended for the particular network device.

If a network path between two particular network devices includes only a single network or network connection, that network is considered to be essential for message passing between the two particular network devices since it is the only possible interconnecting network, so that a loss of the essential network would result in a loss of message passing capability or communication between the two particular network devices. An example of an essential network is shown in FIG. 3 where second network 144 includes second network connection 118. Since first network device 104 and second network device 112 communicate only over second network segment 118 it is considered essential.

Figure 7:
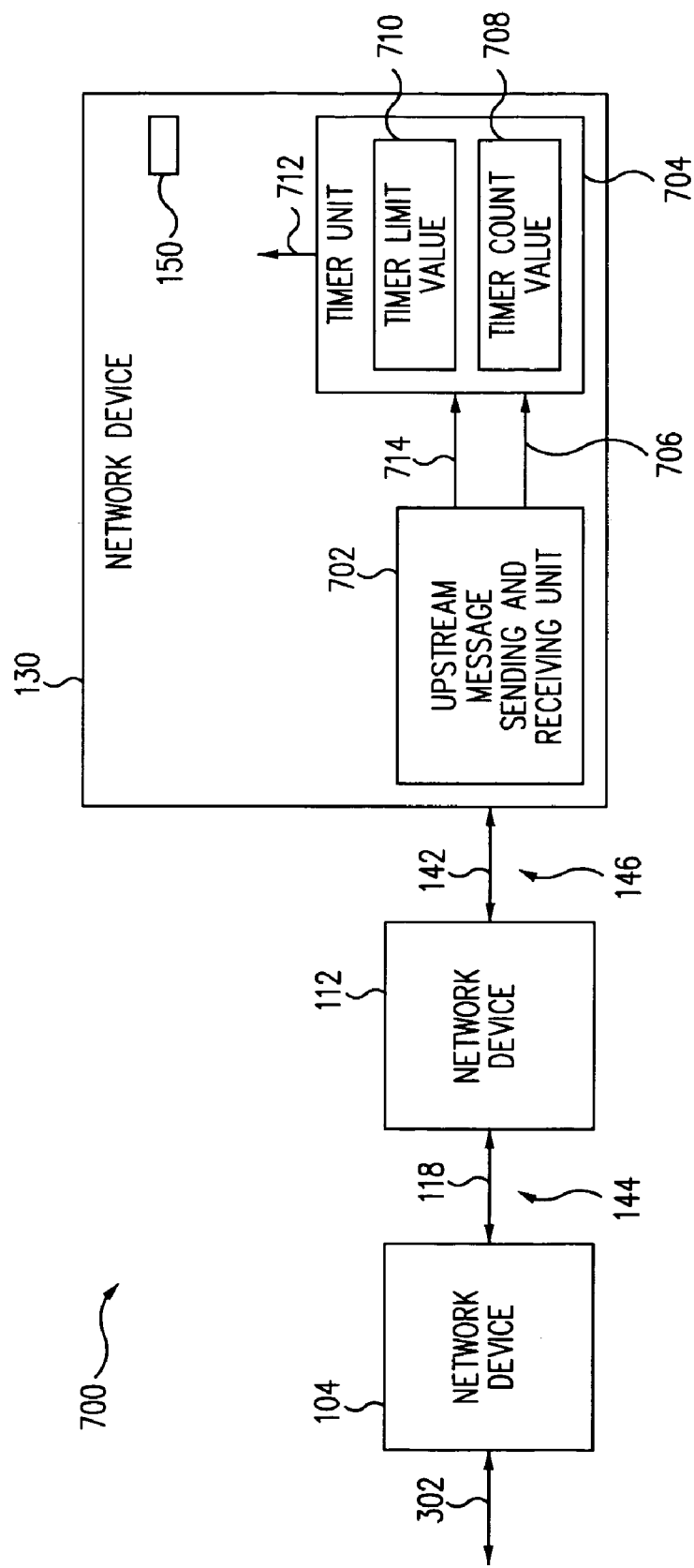
FIG. 7 shows a portion of a hierarchical network including a status detecting system in accordance with an embodiment of the invention.

In reference to FIG. 7, a portion of a hierarchical network includes a status detecting system 700 having an embodiment of third network device 130 that includes an upstream status message sending and receiving unit 702 and a timer unit 704. In this embodiment, upstream message sending and receiving unit 702 sends a status request message in an upstream manner to first network device 104 and asserts a timer start signal 706 to timer unit 704 in order to initialize counting. Alternatively, start signal 706 can be asserted prior to sending the status request message in order to include the time necessary to initialize timer unit 704 within the timer count. Timer unit 704 includes a timer count value 708 and a timer limit value 710. When timer unit 704 receives timer start 706, timer count value 708 is initialized and can begin counting. Preferably, timer count value 708 is initialized to zero where the count advances by incrementing. Alternatively, timer count value 708 can be initialized to a predetermined non-zero value where the count advances by decrementing. Timer count value 708 is compared with timer limit value 710 to determine if timer limit value 710 is exceeded. If timer count value 708 exceeds timer limit value 710, timer unit then asserts a network path status signal 712 as false. Second network device 112 shown in the embodiment of status detecting system 700 differs from second network device 112 in the embodiment of status detecting system 500 based on the presence or absence of various sub-elements having different capabilities as shown and described. Similarly, third network device 130 shown in the embodiment of status detecting system 700 differs from third network device 130 in the embodiment of status detecting system 500 based on the presence or absence of various sub-elements having different capabilities as shown and described.

The status request message traverses third network 146 to reach second network device 112 and traverses second network 144, if it is available, to reach first network device 104. Once first network device 104 receives the status request message from third network device 130, first network device 104 then sends a status reply message in a downstream manner to third network device 130. The status reply message traverses second network 144, if it is available, to reach second network device 112. The status reply message passes through second network device 112 and is asserted on third network 146. The status reply message traverses third network 146 to reach third network device 130.

Once third network device 130 receives the status reply message, upstream message sending and receiving unit 702 asserts a timer stop signal 714 to timer unit 704 in order to stop timer unit 704 from counting. In this manner, timer unit 704 measures the time between when the timer start signal 706 and the timer stop signal 708 are asserted. This time difference corresponds to the round-trip time for the status request message to be sent to a particular target network device on another network and the corresponding status reply message is received. If timer count value 708 exceeds timer limit value 710 while timer count value 708 is advancing, network path status signal 712 is asserted false to accommodate the case where either the status reply message is never received, or is received too late. As described above, second network 144 or network connection 118 is considered essential to this message passing between first network device 104 and third network device 130 since the loss of network connection 118 would have the result that the status request message could never arrive at first network device 104, nor could a status reply message be generated and passed to third network device 130.

Although in this example, the status request message is sent to first network device 104 as a target device, the target device can also be located anywhere on the network beyond second network device 112. As long as second network 144 is included in the only communication path between first network device 104 and second network device 112, the sending of the status request message and the receiving of the status reply message will verify that message traffic is enabled to pass successfully through second network 144. In order to distinguish a legitimate reply from a false reply, the upstream message can include unique information such as a time stamp, a unique code token, or other authenticating information that is included in the reply message to verify that the status reply message is in response to a particular status request message. In another alternative, if third network device 130 utilizes a service from a particular network device, third network device 130 may send a status request message to that particular network device. Upon receiving a reply from the particular network device in a timely manner, third network device 130 can be assured a network path was available very recently and infer the network path is still currently available.

In some aspects, the asserting of a signal and measuring a response can borrow a term called "ping" from a submariner's use of a reflected sonar pulse to determine the presence and location of another object underwater. Similarly, a ping utility program in a UNIX computer environment relies on a timed Internet Protocol (IP) Internet Control Message Protocol (ICMP) using ECHO_REQUEST and ECHO_REPLY packets. In this manner, the UNIX ping utility can be used on-demand to verify the presence and operating status of another device on the network. According to this embodiment, a wireless client that can periodically send and receive ping-type messages across a network and can utilize the response information to provide actual service ready status. For instance, a Wi-Fi telephone could ping a network device on the Internet to discover WAN connection status on the associated AP but a needed Session Initiated Protocol (SIP) server may still be unavailable. To resolve this problem, the WiFi telephone could ping the actual SIP server to discover whether a full end-to-end connection is possible and the SIP server is continually ready prior initiating a call. This method not only verifies that a broadband WAN connection is active but that the actual VoIP service is currently available. If the ping test fails the wireless device can attempt to associate with another WAP/router to gain access to an available WAN or to particular services.

A preferable interval for sending a status request message and receiving a status reply message includes a round-trip delay limit of no more than about 150-microseconds for typical voice service, while a lower delay limit of 100-microseconds or 50-microseconds will ensure even more reliable service. In this case, timer limit value 710 could be set or loaded with a representation of this time delay maximum value that is operative within the actual implementation of the disclosed device and method. One implementation can be a suitably programmed microcomputer with a memory and stored instructions along with interface logic or other hardware to sense the described conditions, store the described information, and produce the described outputs. Other types of service may utilize a different round-trip delay limit, where the maximum delay is programmable depending on the application.

In one embodiment, a representation of the maximum round-trip delay limit is stored in the timer limit value 710 where the timer count value 708 is initialized to increment the count from zero. If timer count value 708 exceeds timer limit value 710, then the round-trip delay was too long and the network path of interest is declared unavailable. Alternatively, a representation of the maximum round-trip delay limit is stored in timer count value 708 which is initialized to decrement the count to zero. In this case, timer limit value 710 can be used to detect a predetermined value, or the timer count value is zero.

Figure 8:
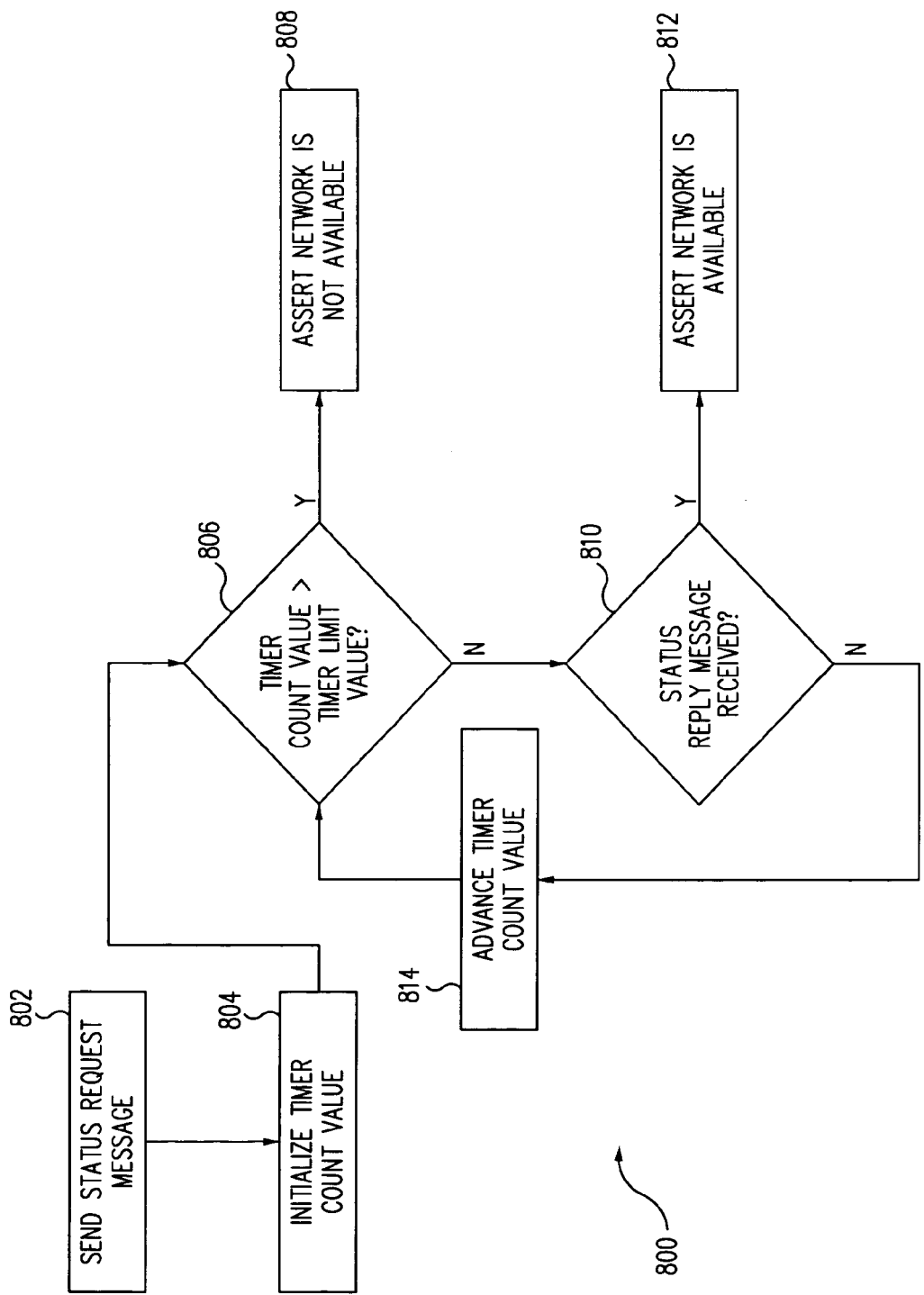
FIG. 8 shows a network availability flow illustrating a method of using a status detecting system in accordance with an embodiment of the invention.

FIG. 8 shows a network availability flow 800 illustrating a method of using the status detecting system 700 as described in reference to FIG. 7. Within the context of FIGS. 7 and 8, first network device 104 is connected to both first network 302 and to second network 144, while second network device 112 is connected to both second network 144 and third network 146. Finally, third network device 130 is only connected to third network 146. In reference to FIG. 8, in a first operation 802, third network device 130 sends a status request message that traverses second network 144, and control moves to operation 804. In operation 804, timer count value 708 within timer unit 704 is initialized, and control moves to operation 806. In operation 806 a test is performed to determine if timer count value 708 within timer unit 704 exceeds timer limit value 710. Alternatively, operation 806 can determine if timer count value 708 is greater than or equal to timer limit value 710. If the timer count value 708 exceeds timer limit value 710, control moves to operation 808 where network available signal 712 is asserted false, thereby asserting the network of interest, second network 144, is not available.

Conversely, if timer count value 708 does not exceed timer limit value 710, control moves to operation 810 where a test is performed to determine if a status reply message was received. If a status reply message was received and the timer count value 708 has not exceeded the timer limit value 710, then control moves to operation 812 where network available signal 712 is asserted thereby asserting the network of interest, second network 144, is available. If a status reply message was not received, then control moves to operation 814 where timer count value 708 is advanced to the next count value and control moves back to operation 806. This looping behavior is repeated at a predetermined period so that third network device 130 can be assured a network path of interest or a network node was available very recently in order to infer the network path or network node is still currently available. Preferably, this status request message is broadcast at least ever 150-microseconds.

It is understood in this disclosure that the designations of first network device, second network device, and third network device and their associated networks are intended to illustrate relationships and interconnections between various network elements so that the same disclosed element may be referenced differently in various embodiments or in the claims. Although the invention has been described with respect to particular embodiments, this description is only an example of the invention's application and should not be taken as a limitation. Consequently, the scope of the invention is set forth in the following claims.

We claim:

1. A network device configured to send and receive messages over a first network and a second network, comprising:
    a network status detector unit configured to detect the availability of the first network and output a first network status signal indicating one of availability or unavailability of the first network;
    a network disabling unit configured to receive the first network status signal and disable wireless communication to the second network when the first network status signal indicates the first network is unavailable; and
    a wireless transmitter configured to send messages on the second network, the wireless transmitter being configured to selectively broadcast a service set identifier (SSID) message, the second network being disabled by turning off the broadcast of the SSID message when the first network is not available.

2. The device of claim 1, wherein the status signal is asserted true when the first network is available, and asserted false when the first network is not available.

3. The device of claim 1, wherein the status signal indicates the first network is unavailable due to one of network congestion, loss of network connection, communication disruption, or network interruption.

4. The device of claim 1, wherein the status signal form includes one of an internal value set in a register, an electrical signal, or as a visual indicator having one of two states.

5. The device of claim 1, wherein the wireless transmitter includes an SSID message to enable or disable voice communication, and an SSID message to enable or disable data communication.

6. The device of claim 1, wherein the second network is enabled by turning on the broadcast of the SSID message when the first network is available.

7. In a network device configured to send and receive messages over an upstream first network and a downstream second network relative to the network device, a method comprising:
- detecting the availability status of the upstream first network; and
- disabling wireless transmission of the downstream second network when the upstream first network is not available,
- wherein the second network is a wireless network and wherein the network device includes a wireless transmitter configured to broadcast a service set identifier (SSID) message for use in granting access to the second network, wherein disabling the second network when the first network is not available further comprises:
- disabling the wireless transmitter broadcast of the SSID.

8. The device of claim 7, wherein the status signal is asserted true when the first network is available, and asserted false when the first network is not available.

9. The device of claim 7, wherein the status signal indicates the first network is unavailable due to one of network congestion, loss of network connection, communication disruption, or network interruption.

10. The device of claim 7, wherein the status signal form includes one of an internal value set in a register, an electrical signal, or as a visual indicator having one of two states.

11. The device of claim 7, wherein the wireless transmitter includes an SSID message to enable or disable voice communication, and an SSID message to enable or disable data communication.

12. The device of claim 7, wherein the second network is enabled by turning on the broadcast of the SSID message when the first network is available.

* * * * *